United States Patent
Xu et al.

(10) Patent No.: US 10,178,129 B2
(45) Date of Patent: Jan. 8, 2019

(54) NETWORK SECURITY METHOD AND DEVICE

(71) Applicant: Huawei Technologies Co., Ltd., Shenzhen (CN)

(72) Inventors: Yibin Xu, Nanjing (CN); Bing Sun, Nanjing (CN); Jun Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 277 days.

(21) Appl. No.: 15/153,195

(22) Filed: May 12, 2016

(65) Prior Publication Data

US 2016/0261638 A1    Sep. 8, 2016

Related U.S. Application Data

(63) Continuation of application No. PCT/CN2014/090878, filed on Nov. 12, 2014.

(30) Foreign Application Priority Data

Nov. 14, 2013  (CN) .......................... 2013 1 0567959

(51) Int. Cl.
   *H04L 29/06*    (2006.01)
(52) U.S. Cl.
   CPC .......... *H04L 63/20* (2013.01); *H04L 63/0218* (2013.01); *H04L 63/0236* (2013.01); *H04L 63/104* (2013.01)
(58) Field of Classification Search
   CPC . H04L 63/0218; H04L 63/0236; H04L 63/20; H04L 63/104; H04L 63/02; H04L 63/0209; H04L 63/0227; H04L 29/06; H04L 29/12018; H04L 41/069; H04L 41/0893; H04L 41/22; H04L 43/04; H04L 43/18; H04L 45/00; H04L 45/04;
   (Continued)

(56) References Cited

U.S. PATENT DOCUMENTS

| 9,380,025 B2 * | 6/2016 | Nellikar .............. H04L 63/0245 |
| 2004/0160903 A1 * | 8/2004 | Gai ...................... H04L 12/4645 370/254 |

(Continued)

FOREIGN PATENT DOCUMENTS

| CN | 1748401 A | 3/2006 |
| CN | 103391274 A | 11/2013 |

OTHER PUBLICATIONS

"Cisco TrustSec Switch Configuration Guide," Cisco, Oct. 2013, 208 pages.

(Continued)

*Primary Examiner* — Jason K Gee
*Assistant Examiner* — Shu C Gao
(74) *Attorney, Agent, or Firm* — Conley Rose, P.C.

(57) ABSTRACT

A network security method and a device relating to the field of network communication where the method includes, recording a correspondence between an Internet Protocol (IP) address and an security group tag (SGT), and executing a network security policy on a receiver of a data packet according to the recorded correspondence between the IP address and the SGT such that SGT information of the receiver does not need to be specially propagated, thereby decreasing network resource consumption and reducing network complexity.

14 Claims, 5 Drawing Sheets

(58) Field of Classification Search
CPC ....... H04L 45/16; H04L 45/24; H04L 45/306;
H04L 45/7453; H04L 47/10; H04L
47/2475; H04L 47/627; H04L 49/201;
H04L 63/061; H04L 63/08; H04L
63/0807; H04L 63/083; H04L 63/0869;
H04L 63/10; H04L 63/101; H04L 63/102;
H04L 63/105; H04L 63/107; H04L
63/168; H04L 63/205; H04L 67/02; H04L
67/141; H04L 67/18; H04L 67/32; H04L
67/327; H04L 69/03; H04L 69/12; H04W
12/04; H04W 12/06
See application file for complete search history.

(56) References Cited

U.S. PATENT DOCUMENTS

| | | | |
|---|---|---|---|
| 2005/0190758 A1* | 9/2005 | Gai | H04L 12/4645 370/389 |
| 2005/0238010 A1 | 10/2005 | Panigrahy et al. | |
| 2006/0106750 A1* | 5/2006 | Smith | H04L 12/56 |
| 2006/0117058 A1* | 6/2006 | Smith | H04L 63/105 |
| 2008/0016550 A1* | 1/2008 | McAlister | H04L 63/105 726/1 |
| 2008/0083011 A1* | 4/2008 | McAlister | H04L 63/20 726/1 |
| 2008/0127327 A1* | 5/2008 | Carrasco | H04L 63/0272 726/15 |
| 2009/0300350 A1* | 12/2009 | Gai | H04L 12/4645 713/160 |
| 2013/0145420 A1 | 6/2013 | Ting et al. | |
| 2015/0012998 A1* | 1/2015 | Nellikar | H04L 63/0245 726/13 |

OTHER PUBLICATIONS

Foreign Communication From a Counterpart Application, European Application No. 14863034.6, Extended European Search Report dated Sep. 28, 2016, 7 pages.

Foreign Communication From a Counterpart Application, PCT Application No. PCT/CN2014/090878, English Translation of International Search Report dated Feb. 23, 2015, 2 pages.

Foreign Communication From a Counterpart Application, PCT Application No. PCT/CN2014/090878, English Translation of Written Opinion dated Feb. 13, 2015, 6 pages.

* cited by examiner

NETWORK SECURITY METHOD AND DEVICE

CROSS-REFERENCE TO RELATED APPLICATIONS

This application is a continuation of International Application No. PCT/CN2014/090878, filed on Nov. 12, 2014, which claims priority to Chinese Patent Application No. 201310567959.9, filed on Nov. 14, 2013, both of which are hereby incorporated by reference in their entireties.

TECHNICAL FIELD

This application relates to the field of network communication, and in particular, to a network security method and a device.

BACKGROUND

In a trusted network security architecture, a secure network is built by establishing a domain of trusted network devices, where the domain is referred to as a trusted domain. Each device in the trusted domain is authenticated by its peers. Communication on a link between devices in the trusted domain is secured using a combination of encryption, a message integrity check, and a mechanism of datapath reply protection. In the trusted network security architecture, device and user credentials acquired during authentication are used for classifying packets that enter the network into security groups (SGs). Packet classification is performed by tagging the packets at the ingress such that the packets can be identified and be applied network security policies corresponding to tags, along a data path. The tags are referred to as security group tags (SGTs) and allow the network to execute the network security policies based on the SGTs.

In the trusted network security architecture, SGT information generally needs to be propagated within trusted domains and across trusted domains. However, SGT information propagation needs to consume network resources and increase network complexity.

SUMMARY

This application provides a network security method and a device to resolve a problem of heavy network resource consumption in a trusted network security architecture.

According to a first aspect, a network security method is provided, including receiving, by a network device, a first data packet that includes a first SGT, where the first SGT is used to identify a SG to which the first data packet belongs, and the network device is located in a trusted domain, recording, by the network device, a first correspondence, where the first correspondence is a correspondence between the first SGT and an Internet Protocol (IP) address in a source IP address field of the first data packet, receiving, by the network device, a second data packet, where an IP address in a destination IP address field of the second data packet is the IP address in the source IP address field of the first data packet, acquiring, by the network device, the first SGT according to the IP address in the destination IP address field of the second data packet and the first correspondence, and acquiring, by the network device, a network security policy according to the acquired first SGT and a preset second correspondence, and executing the network security policy on the second data packet, where the second correspondence is a correspondence between the first SGT and the network security policy.

With reference to the first aspect, in a first implementation manner of the first aspect, the second data packet includes a second SGT, and the second SGT is used to identify a SG to which the second data packet belongs, and acquiring, by the network device, a network security policy according to the acquired first SGT and a preset second correspondence, and executing the network security policy on the second data packet, where the second correspondence is a correspondence between the first SGT and the network security policy further includes acquiring, by the network device, the network security policy according to the second SGT, the acquired first SGT, and the preset second correspondence, and executing the network security policy on the second data packet, where the second correspondence includes correspondences between the first SGT, the second SGT, and the network security policy.

With reference to the first aspect, in a second implementation manner of the first aspect, after receiving, by the network device, a second data packet, the method further includes allocating, by the network device, a second SGT to the second data packet, where the second SGT is used to identify a SG to which the second data packet belongs, and acquiring, by the network device, a network security policy according to the acquired first SGT and a preset second correspondence, and executing the network security policy on the second data packet, where the second correspondence is a correspondence between the first SGT and the network security policy further includes acquiring, by the network device, the network security policy according to the second SGT, the acquired first SGT, and the preset second correspondence, and executing the network security policy on the second data packet, where the second correspondence includes correspondences between the first SGT, the second SGT, and the network security policy.

With reference to any one of the first aspect, the first implementation manner of the first aspect and the second implementation manner of the first aspect, in a third implementation manner of the first aspect, the method further includes sending, by the network device, a synchronization message to one or more other network devices using a network that does not support the first SGT, where a payload of the synchronization message includes the first correspondence, the one or more other network devices are located in a trusted domain different from the trusted domain in which the network device is located, and the network that does not support the first SGT exists between the trusted domain in which the one or more other network devices are located and the trusted domain in which the network device is located.

According to a second aspect, a network security method is provided, including receiving, by a network device, a synchronization message sent by another network device, where a payload of the synchronization message includes a first correspondence, the first correspondence is a correspondence between an IP address and a first SGT, the network device is located in a trusted domain, the other network device is located in another trusted domain, and a network that does not support the first SGT exists between the trusted domain and the other trusted domain, receiving, by the network device, a data packet, where an IP address in a destination IP address field of the data packet is the IP address in the first correspondence, acquiring, by the network device, the first SGT according to the IP address in the destination IP address field of the data packet and the first correspondence, and acquiring, by the network device, a network security policy according to the acquired first SGT and a preset second correspondence, and executing the network security policy on the data packet, where the second correspondence is a correspondence between the first SGT and the network security policy.

With reference to the second aspect, in a first implementation manner of the second aspect, the data packet includes a second SGT, and the second SGT is used to identify a SG to which the second data packet belongs, and acquiring, by the network device, a network security policy according to the acquired first SGT and a preset second correspondence, and executing the network security policy on the data packet, where the second correspondence is a correspondence between the first SGT and the network security policy further includes acquiring, by the network device, the network security policy according to the second SGT, the acquired first SGT, and the preset second correspondence, and executing the network security policy on the data packet, where the second correspondence includes correspondences between the first SGT, the second SGT, and the network security policy.

With reference to the second aspect, in a second implementation manner of the second aspect, after receiving, by the network device, a data packet, the method further includes allocating, by the network device, a second SGT to the data packet, where the second SGT is used to identify a SG to which the data packet belongs, and acquiring, by the network device, a network security policy according to the acquired first SGT and a preset second correspondence, and executing the network security policy on the data packet, where the second correspondence is a correspondence between the first SGT and the network security policy further includes acquiring, by the network device, the network security policy according to the second SGT, the acquired first SGT, and the preset second correspondence, and executing the network security policy on the data packet, where the second correspondence includes correspondences between the first SGT, the second SGT, and the network security policy.

According to a third aspect, a network security apparatus is provided, where the network security apparatus is implemented by a network device, the network device is located in a trusted domain, and the network security apparatus includes a first receiving unit, a recording unit, a second receiving unit, an acquiring unit, and an execution unit, where the first receiving unit is configured to receive a first data packet that includes a first SGT, where the first SGT is used to identify a SG to which the first data packet belongs. The recording unit is configured to record a first correspondence, where the first correspondence is a correspondence between the first SGT and an IP address in a source IP address field of the first data packet. The second receiving unit is configured to receive a second data packet, where an IP address in a destination IP address field of the second data packet is the IP address in the source IP address field of the first data packet. The acquiring unit is configured to acquire the first SGT according to the IP address in the destination IP address field of the second data packet and the first correspondence. The execution unit is configured to acquire a network security policy according to the acquired first SGT and a preset second correspondence, and execute the network security policy on the second data packet, where the second correspondence is a correspondence between the first SGT and the network security policy.

With reference to the third aspect, in a first implementation manner of the third aspect, the second data packet includes a second SGT, and the second SGT is used to identify a SG to which the second data packet belongs, and the execution unit is further configured to acquire the network security policy according to the second SGT, the acquired first SGT, and the preset second correspondence, and execute the network security policy on the second data packet, where the second correspondence includes a correspondence between the network security policy and a combination of the first SGT and the second SGT.

With reference to the third aspect, in a second implementation manner of the third aspect, the apparatus further includes an allocating unit configured to allocate a second SGT to the second data packet after the second receiving unit receives the second data packet, where the second SGT is used to identify a SG to which the second data packet belongs, and the execution unit is further configured to acquire the network security policy according to the second SGT, the acquired first SGT, and the preset second correspondence, and execute the network security policy on the second data packet, where the second correspondence includes correspondences between the first SGT, the second SGT, and the network security policy.

With reference to any one of the third aspect, the first implementation manner of the third aspect and the second implementation manner of the third aspect, in a third implementation manner of the third aspect, the apparatus further includes a sending unit configured to send a synchronization message to one or more other network devices using a network that does not support the first SGT, where a payload of the synchronization message includes the first correspondence, the one or more other network devices are located in a trusted domain different from the trusted domain in which the network device is located, and the network that does not support the first SGT exists between the trusted domain in which the one or more other network devices are located and the trusted domain in which the network device is located.

According to a fourth aspect, a network security apparatus is provided, where the network security apparatus is implemented by a network device, the network device is located in a trusted domain, and the network security apparatus includes a first receiving unit, a second receiving unit, an acquiring unit, and an execution unit, where the first receiving unit is configured to receive a synchronization message sent by another network device, where a payload of the synchronization message includes a first correspondence, the first correspondence is a correspondence between an IP address and a first SGT, the other network device is located in another trusted domain, and a network that does not support the first SGT exists between the trusted domain and the other trusted domain. The second receiving unit is configured to receive a data packet, where an IP address in a destination IP address field of the data packet is the IP address in the first correspondence. The acquiring unit is configured to acquire the first SGT according to the IP address in the destination IP address field of the data packet and the first correspondence, and the execution unit is configured to acquire a network security policy according to the acquired first SGT and a preset second correspondence, and execute the network security policy on the data packet, where the second correspondence is a correspondence between the first SGT and the network security policy.

With reference to the fourth aspect, in a first implementation manner of the fourth aspect, the data packet includes a second SGT, and the second SGT is used to identify a SG to which the second data packet belongs, and the execution unit is further configured to acquire the network security policy according to the acquired second SGT and first SGT, and the preset second correspondence, and execute the network security policy on the data packet, where the second correspondence includes correspondences between the first SGT, the second SGT, and the network security policy.

With reference to the fourth aspect, in a second implementation manner of the fourth aspect, the apparatus further includes an allocating unit configured to allocate a second SGT to the data packet after the second receiving unit receives the data packet. The execution unit is further configured to acquire the network security policy according to the second SGT, the acquired first SGT, and the preset second correspondence, and execute the network security policy on the data packet, where the second correspondence includes correspondences between the first SGT, the second SGT, and the network security policy.

According to a fifth aspect, a network device is provided, where the network device is located in a trusted domain, the network device includes a processor and an interface, and the processor is connected to the interface using a bus, where the processor is configured to execute the following: receiving, by the processor using the interface, a first data packet that includes a first SGT, where the first SGT is used to identify a SG to which the first data packet belongs, recording, by the processor, a first correspondence, where the first correspondence is a correspondence between the first SGT and an IP address in a source IP address field of the first data packet, receiving, by the processor, a second data packet using the interface, where an IP address in a destination IP address field of the second data packet is the IP address in the source IP address field of the first data packet, acquiring, by the processor, the first SGT according to the IP address in the destination IP address field of the second data packet and the first correspondence, and acquiring, by the processor, a network security policy according to the acquired first SGT and a preset second correspondence, and executing the network security policy on the second data packet, where the second correspondence is a correspondence between the first SGT and the network security policy.

With reference to the fifth aspect, in a first implementation manner of the fifth aspect, the second data packet includes a second SGT, and the second SGT is used to identify a SG to which the second data packet belongs, and acquiring, by the processor, a network security policy according to the acquired first SGT and a preset second correspondence, and executing the network security policy on the second data packet, where the second correspondence is a correspondence between the first SGT and the network security policy further includes acquiring, by the processor, the network security policy according to the second SGT, the acquired first SGT, and the preset second correspondence, and executing the network security policy on the second data packet, where the second correspondence includes a correspondence between the network security policy and a combination of the first SGT and the second SGT.

With reference to the fifth aspect, in a second implementation manner of the fifth aspect, after receiving the second data packet using the interface, the processor further allocates a second SGT to the second data packet, where the second SGT is used to identify a SG to which the second data packet belongs, and acquiring, by the processor, a network security policy according to the acquired first SGT and a preset second correspondence, and executing the network security policy on the second data packet, where the second correspondence is a correspondence between the first SGT and the network security policy further includes acquiring, by the processor, the network security policy according to the second SGT, the acquired first SGT, and the preset second correspondence, and executing the network security policy on the second data packet, where the second correspondence includes correspondences between the first SGT, the second SGT, and the network security policy.

With reference to any one of the fifth aspect, the first implementation manner of the fifth aspect and the second implementation manner of the fifth aspect, in a third implementation manner of the fifth aspect, the processor sends, using the interface, a synchronization message to one or more other network devices using a network that does not support the first SGT, where a payload of the synchronization message includes the first correspondence, the one or more other network devices are located in a trusted domain different from the trusted domain in which the network device is located, and the network that does not support the first SGT exists between the trusted domain in which the one or more other network devices are located and the trusted domain in which the network device is located.

According to a sixth aspect, a network device is provided, where the network device is located in a trusted domain, the network device includes a processor and an interface, and the processor is connected to the interface using a bus, where the processor is configured to execute the following: receiving, by the processor using the interface, a synchronization message sent by another network device, where a payload of the synchronization message includes a first correspondence, the first correspondence is a correspondence between an IP address and a first SGT, the other network device is located in another trusted domain, and a network that does not support the first SGT exists between the trusted domain in which the network device is located and the other trusted domain, receiving, by the processor, a data packet using the interface, where an IP address in a destination IP address field of the data packet is the IP address in the first correspondence, acquiring, by the processor, the first SGT according to the IP address in the destination IP address field of the data packet and the first correspondence, and acquiring, by the processor, a network security policy according to the acquired first SGT and a preset second correspondence, and executing the network security policy on the data packet, where the second correspondence is a correspondence between the first SGT and the network security policy.

With reference to the sixth aspect, in a first implementation manner of the sixth aspect, the data packet includes a second SGT, and the second SGT is used to identify a SG to which the second data packet belongs, and acquiring, by the processor, a network security policy according to the acquired first SGT and a preset second correspondence, and executing the network security policy on the data packet, where the second correspondence is a correspondence between the first SGT and the network security policy further includes executing, by the processor, the network security policy according to the second SGT, the acquired first SGT, and the preset second correspondence, where the second correspondence includes correspondences between the first SGT, the second SGT, and the network security policy.

With reference to the sixth aspect, in a second implementation manner of the sixth aspect, after receiving the data packet using the interface, the processor further allocates a second SGT to the data packet, and acquiring, by the processor, a network security policy according to the acquired first SGT and a preset second correspondence, and executing the network security policy on the data packet, where the second correspondence is a correspondence between the first SGT and the network security policy further includes executing, by the processor, the network security policy according to the second SGT, the acquired first SGT, and the preset second correspondence, where the second correspondence includes correspondences between the first SGT, the second SGT, and the network security policy.

In this application, a correspondence between an IP address and an SGT is recorded, and a network security policy is executed on a receiver of a data packet according to the recorded correspondence between the IP address and the SGT such that SGT information of the receiver does not need to be specially propagated, thereby decreasing network resource consumption and reducing network complexity.

DESCRIPTION OF EMBODIMENTS

Figure 1:
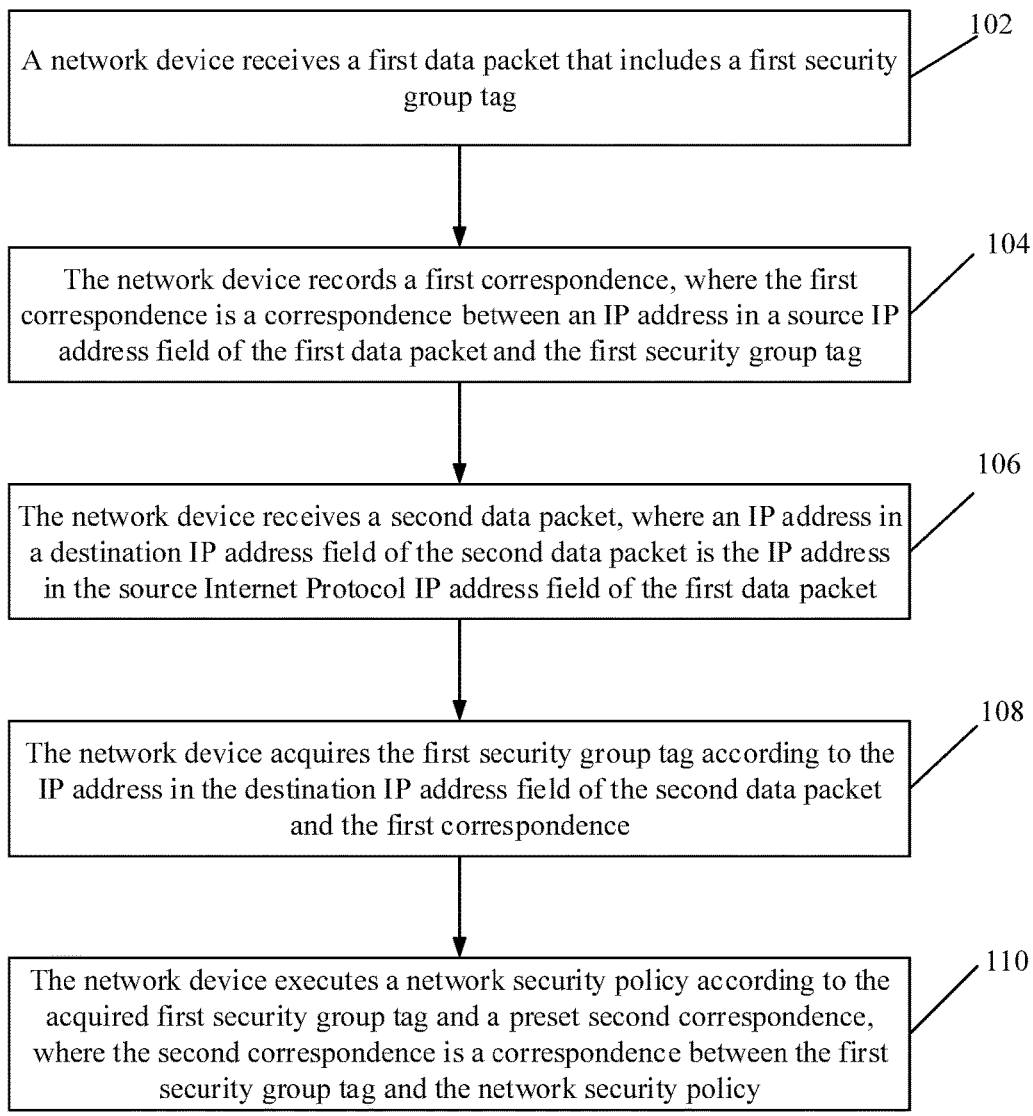
FIG. 1 is a flowchart of a network security method according to an embodiment of the present disclosure.

The following describes an embodiment of the present disclosure with reference to FIG. 1.

FIG. 1 is a flowchart of a network security method according to an embodiment of the present disclosure. The method includes the following steps.

Step 102: A network device receives a first data packet that includes a first SGT.

The network device is a network device in a trusted network security architecture. The network device is located in a trusted domain. In the following, a data packet that is sent and received between any two network devices in the trusted domain is referred to as a data packet in the trusted domain. Each data packet in the trusted domain includes an SGT. The SGT of the data packet in the trusted domain may be in a data link layer header or a network layer header of the data packet. For example, the SGT may be located in a header of an Ethernet frame of the data packet, namely, an Ethernet header, or the SGT may be located in a header of an IP packet of the data packet, namely, an IP header. The first SGT of the first data packet is used to identify a SG to which the first data packet belongs, and the SG can be referred to as a first SG.

Step 104: The network device records a first correspondence, where the first correspondence is a correspondence between an IP address in a source IP address field of the first data packet and the first SGT.

After receiving a data packet in the trusted domain, the network device records a correspondence between an IP address in a source IP address field in an IP header of the data packet and an SGT of the data packet. After the network device receives multiple data packets, the network device records multiple correspondences according to the multiple data packets. The multiple correspondences form a first correspondence set, and the first correspondence set includes multiple correspondences between IP addresses and SGTs. Furthermore, for the first data packet, the network device records the first correspondence, where the first correspondence is the correspondence between the first SGT and the IP address in the source IP address field of the first data packet.

Step 106: The network device receives a second data packet, where an IP address in a destination IP address field of the second data packet is the IP address in the source IP address field of the first data packet.

The network device receives the data packet in the trusted domain, or in a case in which the network device is a network device at an edge of the trusted domain, the network device receives a data packet that just enters the trusted domain. Furthermore, a sender of the first data packet should receive the second data packet. The IP address in the destination IP address field of the second data packet is an IP address of a receiver of the second data packet, namely, an IP address of the sender of the first data packet. Therefore, the destination IP address of the second data packet is the same as the source IP address of the first data packet.

Step 108: The network device acquires the first SGT according to the IP address in the destination IP address field of the second data packet and the first correspondence.

After receiving the data packet, the network device determines whether an IP address in a destination IP address field of the data packet is included in a correspondence in the first correspondence set recorded by the network device, and further determines, according to the correspondence, an SGT corresponding to the destination IP address of the data packet. A network security policy not only may be related to a SG of a sender of the data packet, but also may be related to a SG of a receiver of the data packet. Determining, according to the first correspondence set recorded by the network device, the SGT related to the destination IP address of the data packet can help implement network security policy execution based on the receiver of the data packet. Determining the SGT of the receiver of the data packet according to the first correspondence set recorded by the network device can avoid using a dedicated protocol to propagate the SGT. Furthermore, for the second data packet, the network device finds the first correspondence according to the destination IP address of the second data packet after the network device receives the second data packet. The first SGT in the first correspondence is an SGT corresponding to the receiver of the second data packet, namely, an SGT corresponding to the sender of the first data packet.

Step 110: The network device acquires a network security policy according to the acquired first SGT and a preset second correspondence, and executes the network security policy on the second data packet, where the second correspondence is a correspondence between the first SGT and the network security policy.

There is a preset second correspondence set in the network device. The second correspondence set includes multiple correspondences, where at least one correspondence includes a network security policy that is executed based on the SGT of the receiver of the data packet. The network device obtains, according to the SGT corresponding to the receiver of the second data packet, namely, the first SGT, one correspondence from the second correspondence set. This correspondence is referred to as the second correspondence. The second correspondence includes the network security policy that is executed based on the SGT of the receiver of the data packet, namely, the first SGT. The network device acquires the network security policy corresponding to the first SGT. Then, the network device may execute the network security policy on the second data packet according to the network security policy corresponding to the first SGT.

The network security policy may be related to the SG of the sender of the data packet, may be related to the SG of the receiver of the data packet, or may be related to a combination of the SG of the sender of the data packet and the SG of the receiver of the data packet. In the last case, at least one correspondence in the second correspondence set includes a network security policy that is executed based on a combination of the SGT of the receiver of the data packet and the SGT of the sender of the data packet. That is, in the at least one correspondence, the network security policy is corresponding to the combination of the two SGTs.

If it is the data packet in the trusted domain that the network device receives, that is, the second data packet includes an SGT of the second data packet, namely, a second SGT, then the network device acquires, according to the acquired first SGT, the second SGT, and a correspondence that includes the first SGT and the second SGT, namely, the second correspondence, in the second correspondence set, a network security policy corresponding to a combination of the first SGT and the second SGT in the second correspondence. Then, the network device executes the network security policy on the second data packet. The second SGT is used to identify a SG to which the second data packet belongs.

If the second data packet received by the network device does not include the SGT of the second data packet, the network device allocates the second SGT to the second data packet. The second SGT is used to identify the SG to which the second data packet belongs. Generally, in the case in which the network device is the network device at the edge of the trusted domain, the second data packet just enters the trusted domain and no SGT is allocated to the second data packet by another network device in the trusted domain, and the network device as the ingress to the trusted domain allocates the second SGT to the second data packet according to device and user credentials acquired during authentication. The network device adds, to the second data packet, the second SGT allocated to the second data packet. The network device acquires, according to the acquired first SGT, the second SGT allocated to the second data packet, and the correspondence that includes the first SGT and the second SGT, namely, the second correspondence, in the second correspondence set, the network security policy corresponding to the combination of the first SGT and the second SGT in the second correspondence, and executes the network security policy on the second data packet.

A network that does not support the trusted network security architecture, namely, a network that does not support an SGT, may exist between two or more trusted domains. In a case in which the network device is at an edge of one of the domains, if the network device is an egress for a data packet, the network device may propagate a correspondence, recorded by the network device, between an IP address and an SGT to another trusted domain, where the network that does not support the trusted network security architecture exists between the trusted domain in which the network device is located and the other trusted domain. For example, the network device sends a synchronization message to one or more other network devices via a network that does not support the first SGT, where a payload of the synchronization message includes the first correspondence. The one or more other network devices are located in a trusted domain different from the trusted domain in which the network device is located. The network that does not support the first SGT exists between the trusted domain in which the one or more other network devices are located and the trusted domain in which the network device is located.

Generally, if the synchronization message is a data link layer frame, that is, the synchronization message does not include a network layer header, the payload of the synchronization message is a data link layer payload. The payload of the synchronization message is a network layer payload if the synchronization message is a network layer packet. For processing of the synchronization message by the network device that receives the synchronization message, refer to an embodiment illustrated in FIG. 2.

Before performing the steps in this embodiment of the present disclosure, multiple network devices in the trusted domain may initiate a capability negotiation procedure, to determine whether each network device in the trusted domain supports a function, in this embodiment of the present disclosure, of acquiring the first correspondence set using the data packet. In a case in which a network device that does not support the function, in this embodiment of the present disclosure, of acquiring the first correspondence set using the data packet exists in the trusted domain, a network device that supports this embodiment of the present disclosure sends a synchronization message to the network device that does not support this embodiment of the present disclosure in order to propagate a correspondence, recorded by the network device, between an IP address and an SGT.

In this embodiment, a network device records a correspondence, between an IP address and an SGT, that is in a received data packet, and another network device does not need to propagate SGT information to the network device using a dedicated protocol, thereby decreasing network resource consumption and reducing network complexity. In addition, the network device executes, according to the correspondence between the IP address and the SGT recorded by the network device, a network security policy with respect to a receiver of a data packet, and SGT information of the receiver does not need to be specially propagated to the network device, thereby decreasing network resource consumption and reducing network complexity.

Figure 2:
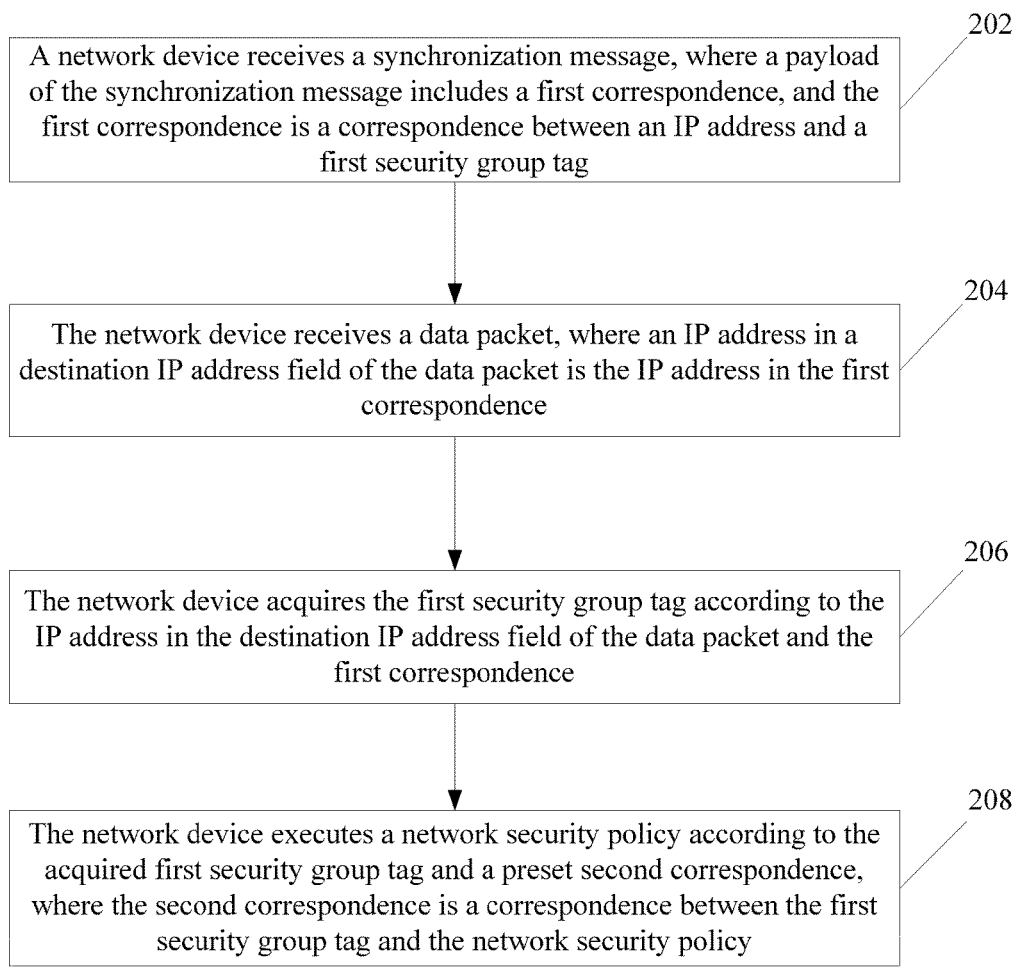
FIG. 2 is a flowchart of a network security method according to another embodiment of the present disclosure.

The following describes another embodiment of the present disclosure with reference to FIG. 2.

FIG. 2 is a flowchart of a network security method according to another embodiment of the present disclosure. The method includes the following steps.

Step 202: A network device receives a synchronization message, where a payload of the synchronization message includes a first correspondence, and the first correspondence is a correspondence between an IP address and a first SGT.

The network device is a network device in a trusted network security architecture. The network device is located in a trusted domain. In the following, a data packet that is sent and received between any two network devices in the trusted domain is referred to as a data packet in the trusted domain. Each data packet in the trusted domain includes an SGT. The SGT of the data packet in the trusted domain may be in a data link layer header or a network layer header of the data packet. For example, the SGT may be located in a header of an Ethernet frame of the data packet, namely, an Ethernet header, or the SGT may be located in a header of an Internet Protocol packet of the data packet, namely, an IP header. The SGT of the data packet in the trusted domain is used to identify a SG to which the data packet belongs.

A network that does not support the trusted network security architecture, namely, a network that does not support an SGT, may exist between two or more trusted domains. A network device at an edge of one of the trusted domains is an egress for a data packet. The network device at the edge of the trusted domain sends the synchronization message to a network device, namely, an entity for executing this embodiment, in another trusted domain via the network that does not support the SGT, where the payload of the synchronization message includes the first correspondence. For processing of generating the synchronization message by the network device that sends the synchronization message, refer to the embodiment illustrated in FIG. 1.

After receiving the synchronization message, the network device records the correspondence between the IP address and the SGT in the synchronization message. After the network device receives multiple synchronization messages, the network device records multiple correspondences according to the multiple synchronization messages. The multiple correspondences form a first correspondence set, and the first correspondence set includes multiple correspondences between IP addresses and SGTs.

Step 204: The network device receives a data packet, where an IP address in a destination IP address field of the data packet is the IP address in the first correspondence.

The network device receives a data packet in the trusted domain, or in a case in which the network device is a network device at an edge of the trusted domain, the network device receives a data packet that just enters the trusted domain. In a case in which the network device has received a synchronization message related to a receiver of the data packet, an IP address of the receiver of the data packet is an IP address in a correspondence in this synchronization message. That is, an IP address in one correspondence in the first correspondence set recorded by the network device, namely, in the foregoing first correspondence, is the same as the IP address in the destination IP address field of the data packet.

If the data packet received by the network device does not include an SGT, and an IP address in a source IP address field of the data packet is the IP address in the first correspondence, the network device adds the first SGT in the first correspondence to the data packet according to the source IP address of the data packet and the first correspondence.

Step 206: The network device acquires the first SGT according to the IP address in the destination IP address field of the data packet and the first correspondence.

After receiving the data packet, the network device determines whether an IP address in a destination IP address field of the data packet is included in a correspondence in the first correspondence set recorded by the network device, and further determines, according to the correspondence, an SGT corresponding to the destination IP address of the data packet. A network security policy not only may be related to a SG of a sender of the data packet, but also may be related to a SG of a receiver of the data packet. Determining, according to the first correspondence set recorded by the network device, an SGT related to a destination IP address of the data packet can help implement network security policy execution based on the receiver of the data packet. Further, for the data packet in which the IP address in the destination IP address field is the IP address in the first correspondence, the network device finds the first correspondence according to the destination IP address of the data packet after the network device receives the data packet. The first SGT in the first correspondence is an SGT corresponding to a receiver of a second data packet.

Step 208: The network device acquires a network security policy according to the acquired first SGT and a preset second correspondence, and executes the network security policy on the data packet, where the second correspondence is a correspondence between the first SGT and the network security policy.

There is a preset second correspondence set in the network device. The second correspondence set includes multiple correspondences, where at least one correspondence includes a network security policy that is executed based on the SGT of the receiver of the data packet. The network device obtains, according to the SGT corresponding to the receiver of the data packet, namely, the first SGT, one correspondence from the second correspondence set. This correspondence is referred to as the second correspondence. The second correspondence includes the network security policy that is executed based on the SGT of the receiver of the data packet, namely, the first SGT. The network device acquires the network security policy corresponding to the first SGT. Then, the network device may execute the network security policy on the data packet according to the network security policy corresponding to the first SGT.

The network security policy may be related to the SG of the sender of the data packet, may be related to the SG of the receiver of the data packet, or may be related to a combination of the SG of the sender of the data packet and the SG of the receiver of the data packet. In the last case, at least one correspondence in the second correspondence set includes a network security policy that is executed based on a combination of the SGT of the receiver of the data packet and an SGT of the sender of the data packet. That is, in the at least one correspondence, the network security policy is corresponding to the combination of the two SGTs.

If it is the data packet in the trusted domain that the network device receives, that is, the data packet includes an SGT of the data packet, namely, a second SGT, then the network device acquires, according to the acquired first SGT, the second SGT, and a correspondence that includes the first SGT and the second SGT, namely, the second correspondence, in the second correspondence set, a network security policy corresponding to a combination of the first SGT and the second SGT in the second correspondence. Then, the network device executes the network security policy on the data packet. The second SGT is used to identify a SG to which the data packet belongs.

The network device allocates the second SGT to the data packet if the data packet received by the network device does not include the SGT of the data packet. The second SGT is used to identify the SG to which the data packet belongs. Generally, in the case in which the network device is the network device at the edge of the trusted domain, the data packet just enters the trusted domain and no SGT is allocated to the data packet by another network device in the trusted domain, and the network device as the ingress to the trusted domain allocates the second SGT to the data packet according to device and user credentials acquired during authentication. The network device adds, to the data packet, the second SGT allocated to the data packet. The network device acquires, according to the acquired first SGT, the second SGT allocated to the data packet, and the correspondence that includes the first SGT and the second SGT, namely, the second correspondence, in the second correspondence set, the network security policy corresponding to the combination of the first SGT and the second SGT in the second correspondence, and executes the network security policy on the data packet.

In this embodiment, a network device records a correspondence between an IP address and an SGT and executes, according to the correspondence between the IP address and the SGT recorded by the network device, a network security policy with respect to a receiver of a data packet, and SGT information of the receiver does not need to be specially propagated to the network device, thereby decreasing network resource consumption and reducing network complexity.

Figure 3:
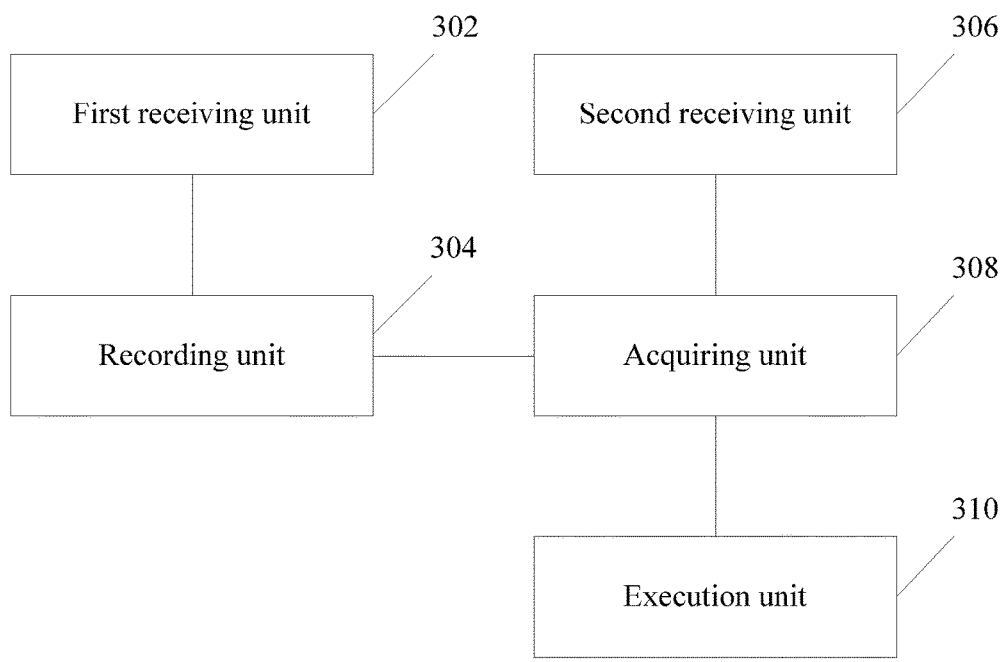
FIG. 3 is a block diagram of a network security apparatus according to still another embodiment of the present disclosure.

The following describes still another embodiment of the present disclosure with reference to FIG. 3.

FIG. 3 is a block diagram of a network security apparatus according to still another embodiment of the present disclosure. The network security apparatus is implemented by a network device in a trusted network security architecture. The network security apparatus includes a first receiving unit 302, a recording unit 304, a second receiving unit 306, an acquiring unit 308, and an execution unit 310.

The first receiving unit 302 is configured to receive a first data packet that includes a first SGT.

The network device that implements the network security apparatus is a network device in the trusted network security architecture. The network device is located in a trusted domain. In the following, a data packet that is sent and received between any two network devices in the trusted domain is referred to as a data packet in the trusted domain. Each data packet in the trusted domain includes an SGT. The SGT of the data packet in the trusted domain may be in a data link layer header or a network layer header of the data packet. For example, the SGT may be located in a header of an Ethernet frame of the data packet, namely, an Ethernet header, or the SGT may be located in a header of an IP packet of the data packet, namely, an IP header. The first SGT in the first data packet is used to identify a SG to which the first data packet belongs, and the SG can be referred to as a first SG.

The recording unit 304 is configured to record a first correspondence, where the first correspondence is a correspondence between an IP address in a source IP address field of the first data packet and the first SGT.

After the first receiving unit 302 receives a data packet in the trusted domain, the recording unit 304 records a correspondence between an IP address in a source IP address field in an IP header of the data packet and an SGT of the data packet. After the first receiving unit 302 receives multiple data packets, the recording unit 304 records multiple correspondences according to the multiple data packets. The multiple correspondences form a first correspondence set, and the first correspondence set includes multiple correspondences between IP addresses and SGTs. Furthermore, for the first data packet, the recording unit 304 records the first correspondence, where the first correspondence is the correspondence between the first SGT and the IP address in the source IP address field of the first data packet.

The second receiving unit 306 is configured to receive a second data packet, where an IP address in a destination IP address field of the second data packet is the IP address in the source IP address field of the first data packet.

The second receiving unit 306 receives the data packet in the trusted domain, or in a case in which the network device is a network device at an edge of the trusted domain, the second receiving unit 306 receives a data packet that just enters the trusted domain. Further, a sender of the first data packet should receive the second data packet. The IP address in the destination IP address field of the second data packet is an IP address of a receiver of the second data packet, namely, an IP address of the sender of the first data packet. Therefore, the destination IP address of the second data packet is the same as the source IP address of the first data packet.

The acquiring unit 308 is configured to acquire the first SGT according to the IP address in the destination IP address field of the second data packet and the first correspondence.

After the second receiving unit 306 receives the data packet, the acquiring unit 308 determines whether an IP address in a destination IP address field of the data packet is included in a correspondence in the first correspondence set recorded by the recording unit 304, and further determines, according to the correspondence, an SGT corresponding to the destination IP address of the data packet. A network security policy not only may be related to a SG of a sender of the data packet, but also may be related to a SG of a receiver of the data packet. Determining, according to the first correspondence set recorded by the network device, the SGT related to the destination IP address of the data packet can help implement network security policy execution based on the receiver of the data packet. Determining an SGT of the receiver of the data packet according to the first correspondence set recorded by the recording unit 304 can avoid using a dedicated protocol to propagate the SGT. Furthermore, for the second data packet, the acquiring unit 308 finds the first correspondence according to the destination IP address of the second data packet after the second receiving unit 306 receives the second data packet. The first SGT in the first correspondence is an SGT corresponding to the receiver of the second data packet, namely, the sender of the first data packet.

The execution unit 310 is configured to acquire a network security policy according to the acquired first SGT and a preset second correspondence, and execute the network security policy on the second data packet, where the second correspondence is a correspondence between the first SGT and the network security policy.

There is a preset second correspondence set in the network device. The second correspondence set includes multiple correspondences, where at least one correspondence includes a network security policy that is executed based on the SGT of the receiver of the data packet. The execution unit 310 obtains, according to the SGT corresponding to the receiver of the second data packet, namely, the first SGT, one correspondence from the second correspondence set. This correspondence is referred to as the second correspondence. The second correspondence includes the network security policy that is executed based on the SGT of the receiver of the data packet, namely, the first SGT. The execution unit 310 acquires the network security policy corresponding to the first SGT. Then, the execution unit 310 may execute the network security policy on the second data packet according to the network security policy corresponding to the first SGT.

The network security policy may be related to the SG of the sender of the data packet, may be related to the SG of the receiver of the data packet, or may be related to a combination of the SG of the sender of the data packet and the SG of the receiver of the data packet. In the last case, at least one correspondence in the second correspondence set includes a network security policy that is executed based on a combination of the SGT of the receiver of the data packet and the SGT of the sender of the data packet. That is, in the at least one correspondence, the network security policy is corresponding to the combination of the two SGTs.

If it is the data packet in the trusted domain that the second receiving unit 306 receives, that is, the second data packet includes an SGT of the second data packet, namely, a second SGT, then the execution unit 310 acquires, according to the first SGT acquired by the acquiring unit 308, the second SGT, and a correspondence that includes the first SGT and the second SGT, namely, the second correspondence, in the second correspondence set, a network security policy corresponding to a combination of the first SGT and the second SGT in the second correspondence, and executes the network security policy.

If the second data packet received by the second receiving unit 306 does not include the SGT of the second data packet, the network security apparatus further includes an allocating unit configured to allocate the second SGT to the second data packet. Generally, in a case in which the network device is the network device at the edge of the trusted domain, the second data packet just enters the trusted domain and no SGT is allocated to the second data packet by another network device in the trusted domain, and the network device that implements the network security apparatus serves as the ingress to the trusted domain, and the allocating unit of the network security apparatus allocates the second SGT to the second data packet according to device and user credentials acquired during authentication. The allocating unit adds, to the second data packet, the second SGT allocated to the second data packet. The execution unit 310 acquires, according to the first SGT acquired by the acquiring unit 308, the second SGT allocated to the second data packet, and the correspondence that includes the first SGT and the second SGT, namely, the second correspondence, in the second correspondence set, the network security policy corresponding to the combination of the first SGT and the second SGT in the second correspondence, and executes the network security policy on the second data packet. The second SGT is used to identify a SG to which the second data packet belongs.

A network that does not support the trusted network security architecture, namely, a network that does not support an SGT, may exist between two or more trusted domains. The second SGT is used to identify the SG to which the second data packet belongs. In the foregoing case in which the network device that implements the network security apparatus is at an edge of one of the domains, if the network device is an egress for a data packet, the network device may propagate a correspondence, recorded by the network device, between an IP address and an SGT to another trusted domain, where the network that does not support the trusted network security architecture exists between the trusted domain in which the network device is located and the other trusted domain. For example, the network security apparatus includes a sending unit, and the sending unit is configured to send a synchronization message to one or more other network devices via a network that does not support the first SGT, where a payload of the synchronization message includes the first correspondence. Generally, if the synchronization message is a data link layer frame, that is, the synchronization message does not include a network layer header, the payload of the synchronization message is a data link layer payload, if the synchronization message is a network layer packet, the payload of the synchronization message is a network layer payload. For processing of the synchronization message by the network device that receives the synchronization message, refer to an embodiment illustrated in FIG. 4.

Before performing the steps in this embodiment of the present disclosure, multiple network devices in the trusted domain may initiate a capability negotiation procedure, to determine whether each network device in the trusted domain supports a function, in this embodiment of the present disclosure, of acquiring the first correspondence set using the data packet. In a case in which a network device that does not support the function, in this embodiment of the present disclosure, of acquiring the first correspondence set using the data packet exists in the trusted domain, the sending unit of the network security apparatus implemented by the network device that supports this embodiment of the present disclosure sends a synchronization message to the network device that does not support this embodiment of the present disclosure in order to propagate a correspondence, recorded by the network device, between an IP address and an SGT.

In this embodiment, a network security apparatus records a correspondence, between an IP address and an SGT, that is in a received data packet, and another network device does not need to propagate SGT information to the network security apparatus using a dedicated protocol, thereby decreasing network resource consumption and reducing network complexity. In addition, the network security apparatus executes, according to the correspondence between the IP address and the SGT recorded by the network security apparatus, a network security policy with respect to a receiver of a data packet, and SGT information of the receiver does not need to be specially propagated to the network security apparatus, thereby decreasing network resource consumption and reducing network complexity.

Figure 4:
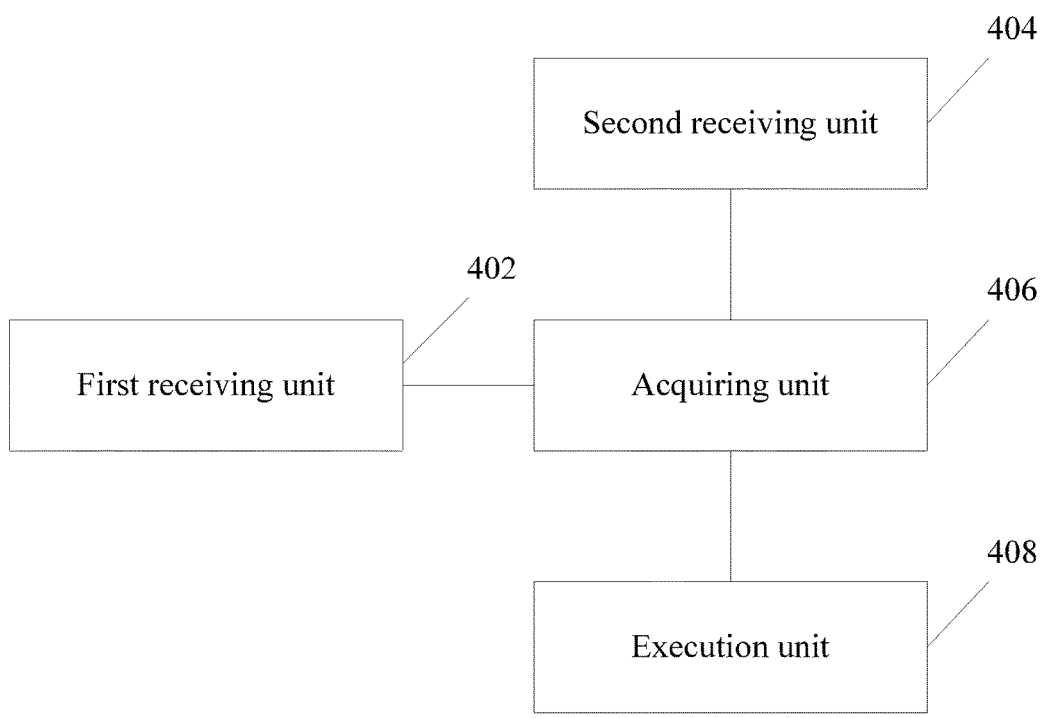
FIG. 4 is a block diagram of a network security apparatus according to another embodiment of the present disclosure.

The following describes another embodiment of the present disclosure with reference to FIG. 4.

FIG. 4 is a block diagram of a network security apparatus according to another embodiment of the present disclosure. The network security apparatus is implemented by a network device in a trusted network security architecture. The network security apparatus includes a first receiving unit 402, a second receiving unit 404, an acquiring unit 406, and an execution unit 408.

The first receiving unit 402 is configured to receive a synchronization message, where a payload of the synchronization message includes a first correspondence, and the first correspondence is a correspondence between an IP address and a first SGT.

The network device that implements the network security apparatus is a network device in the trusted network security architecture. The network device is located in a trusted domain. In the following, a data packet that is sent and received between any two network devices in the trusted domain is referred to as a data packet in the trusted domain. Each data packet in the trusted domain includes an SGT. The SGT of the data packet in the trusted domain may be in a data link layer header or a network layer header of the data packet. For example, the SGT may be located in a header of an Ethernet frame of the data packet, namely, an Ethernet header, or the SGT may be located in a header of an Internet Protocol packet of the data packet, namely, an IP header. The SGT of the data packet in the trusted domain is used to identify a SG to which the data packet belongs.

A network that does not support the trusted network security architecture, namely, a network that does not support an SGT, may exist between two or more trusted domains. A network device at an edge of one of the trusted domains is an egress for a data packet. The network device at the edge of the trusted domain sends the synchronization message to a network device, namely, the network device that implements the network security apparatus, in another trusted domain via the network that does not support the SGT, where the payload of the synchronization message includes the first correspondence. For processing of generating the synchronization message by a network security apparatus implemented by the network device that sends the synchronization message, refer to the embodiment illustrated in FIG. 3.

After receiving the synchronization message, the first receiving unit 402 records the correspondence between the IP address and the SGT in the synchronization message. After receiving multiple synchronization messages, the first receiving unit 402 records multiple correspondences according to the multiple synchronization messages. The multiple correspondences form a first correspondence set, and the first correspondence set includes multiple correspondences between IP addresses and SGTs.

The second receiving unit 404 is configured to receive a data packet, where an IP address in a destination IP address field of the data packet is the IP address in the first correspondence.

The second receiving unit 404 receives a data packet in the trusted domain, or in a case in which the network device that implements the network security apparatus is a network device at an edge of the trusted domain, the second receiving unit 404 receives a data packet that just enters the trusted domain. In a case in which the first receiving unit 402 has received a synchronization message related to a receiver of the data packet, an IP address of the receiver of the data packet is an IP address in a correspondence in this synchronization message. That is, an IP address in one correspondence in the first correspondence set recorded by the first receiving unit 402, namely, in the foregoing first correspondence, is the same as the IP address in the destination IP address field of the data packet.

If the data packet received by the second receiving unit 404 does not include an SGT, and an IP address in a source IP address field of the data packet is the IP address in the first correspondence, the second receiving unit 404 adds the first SGT in the first correspondence to the data packet according to the source IP address of the data packet and the first correspondence.

The acquiring unit 406 is configured to acquire the first SGT according to the IP address in the destination IP address field of the data packet and the first correspondence.

After the second receiving unit 404 receives the data packet, the acquiring unit 406 determines whether an IP address in a destination IP address field of the data packet is included in a correspondence in the first correspondence set recorded by the network device, and further determines, according to the correspondence, an SGT corresponding to the destination IP address of the data packet. A network security policy not only may be related to a SG of a sender of the data packet, but may also be related to a SG of a receiver of the data packet. The acquiring unit 406 determines, according to the first correspondence set recorded by the first receiving unit 402, an SGT related to a destination IP address of the data packet, which can help implement network security policy execution based on the receiver of the data packet. Furthermore, for the data packet in which the IP address in the destination IP address field is the IP address in the first correspondence, the acquiring unit 406 finds the first correspondence according to the destination IP address of the data packet after the second receiving unit 404 receives the data packet. The first SGT in the first correspondence is an SGT corresponding to a receiver of a second data packet.

The execution unit 408 is configured to acquire a network security policy according to the acquired first SGT and a preset second correspondence, and execute the network security policy on the data packet, where the second correspondence is a correspondence between the first SGT and the network security policy.

There is a preset second correspondence set in the network device. The second correspondence set includes multiple correspondences, where at least one correspondence includes a network security policy that is executed based on the SGT of the receiver of the data packet. The execution unit 408 obtains, according to the SGT corresponding to the receiver of the data packet, namely, the first SGT, one correspondence from the second correspondence set. This correspondence is referred to as the second correspondence. The second correspondence includes the network security policy that is executed based on the SGT of the receiver of the data packet, namely, the first SGT. The execution unit 408 acquires the network security policy corresponding to the first SGT. Then, the execution unit 408 may execute the network security policy on the data packet according to the network security policy corresponding to the first SGT.

The network security policy may be related to the SG of the sender of the data packet, may be related to the SG of the receiver of the data packet, or may be related to a combination of the SG of the sender of the data packet and the SG of the receiver of the data packet. In the last case, at least one correspondence in the second correspondence set includes a network security policy that is executed based on a combination of the SGT of the receiver of the data packet and an SGT of the sender of the data packet. That is, in the at least one correspondence, the network security policy is corresponding to the combination of the two SGTs.

If it is the data packet in the trusted domain that the second receiving unit 404 receives, that is, the data packet includes an SGT of the data packet, namely, a second SGT, then the execution unit 408 acquires, according to the acquired first SGT, the second SGT, and a correspondence that includes the first SGT and the second SGT, namely, the second correspondence, in the second correspondence set, a network security policy corresponding to a combination of the first SGT and the second SGT in the second correspondence, and executes the network security policy on the data packet. The second SGT is used to identify a SG to which the data packet belongs.

If the data packet received by the second receiving unit 404 does not include the SGT of the data packet, the network security apparatus further includes an allocating unit configured to allocate the second SGT to the data packet. The second SGT is used to identify the SG to which the data packet belongs. Generally, in a case in which the network device that implements the network security apparatus is the network device at the edge of the trusted domain, the data packet just enters the trusted domain and no SGT is allocated to the data packet by another network device in the trusted domain, and the network device serves as the ingress to the trusted domain, and the allocating unit of the network security apparatus allocates the second SGT to the data packet according to device and user credentials acquired during authentication. The allocating unit adds, to the data packet, the second SGT allocated to the data packet. The execution unit 408 acquires, according to the acquired first SGT, the second SGT allocated to the data packet, and the correspondence that includes the first SGT and the second SGT, namely, the second correspondence, in the second correspondence set, the network security policy corresponding to the combination of the first SGT and the second SGT in the second correspondence, and executes the network security policy on the data packet.

In this embodiment, a network security apparatus records a correspondence between an IP address and an SGT and executes, according to the correspondence between the IP address and the SGT recorded by the network security apparatus, a network security policy with respect to a receiver of a data packet, and SGT information of the receiver does not need to be specially propagated to the network security apparatus, thereby decreasing network resource consumption and reducing network complexity.

Figure 5:
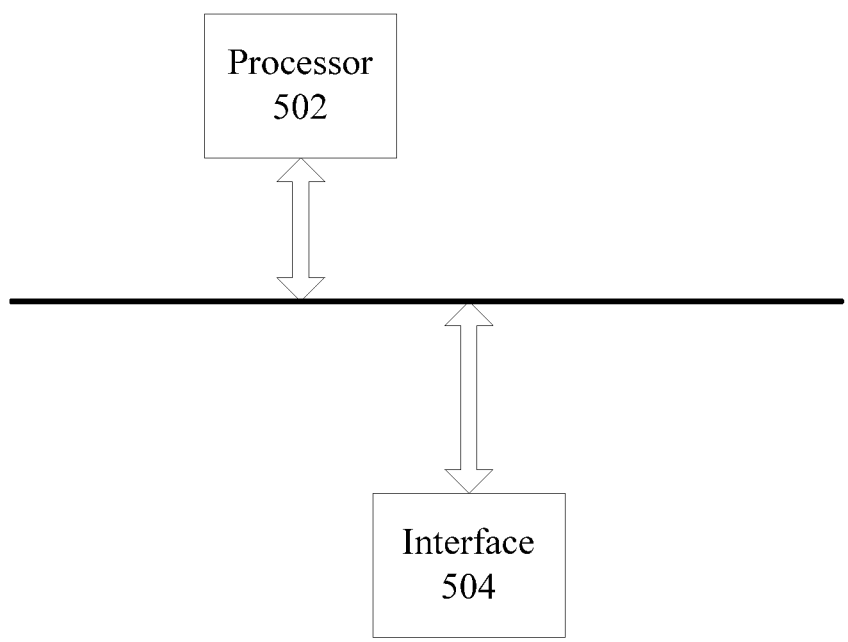
FIG. 5 is a structural diagram of a network device according to still another embodiment of the present disclosure.

The following describes still another embodiment of the present disclosure with reference to FIG. 5.

FIG. 5 is a structural diagram of a network device according to still another embodiment of the present disclosure. A specific form of the network device may be a router, a network switch, a gateway device, a firewall device, or the like. The network device includes a processor 502 and an interface 504. The processor 502 is connected to the interface 504 using a bus. The bus is represented by a bold line in FIG. 5.

The interface 504 may be implemented by an optical transceiver, an electrical transceiver, a wireless transceiver, or any combination thereof. For example, the optical transceiver may be a small form-factor pluggable (SFP) transceiver, an enhanced small form-factor pluggable (SFP+) transceiver, or a 10 gigabit small form-factor pluggable (XFP) transceiver. The electrical transceiver may be an Ethernet network interface controller (NIC). The wireless transceiver may be a wireless network interface controller (WNIC). The interface 504 may include multiple physical interfaces. For example, the interface 504 includes multiple Ethernet interfaces.

The processor 502 may be a central processing unit (CPU), may be a hardware chip, or may be a combination of a CPU and a hardware chip. The hardware chip may be a combination of one or more of the following items: an application-specific integrated circuit (ASIC), a field-programmable gate array (FPGA), a complex programmable logic device (CPLD), and a network processor (NP).

In a case in which the processor 502 is a CPU or the processor 502 is a combination of a CPU and a hardware chip, the network device further includes a memory configured to store program code and transmit the program code to the processor. The memory may include a volatile memory, such as a random-access memory (RAM), the memory may include a non-volatile memory, such as a read-only memory (ROM), a flash memory, a hard disk drive (HDD), or a solid state drive (SSD), or the memory may include a combination of the foregoing types of memories. Alternatively, the memory may include a content addressable memory (CAM), such as a ternary CAM (TCAM). The processor 502 is connected to the memory using a bus.

In a first scenario of this embodiment, the processor 502 performs the following steps.

First, the processor 502 receives, using the interface 504, a first data packet that includes a first SGT.

The network device is a network device in a trusted network security architecture. The network device is located in a trusted domain. In the following, a data packet that is sent and received between any two network devices in the trusted domain is referred to as a data packet in the trusted domain. Each data packet in the trusted domain includes an SGT. The SGT of the data packet in the trusted domain may be in a data link layer header or a network layer header of the data packet. For example, the SGT may be located in a header of an Ethernet frame of the data packet, namely, an Ethernet header, or the SGT may be located in a header of an IP packet of the data packet, namely, an IP header. The first SGT in the first data packet is used to identify a SG to which the first data packet belongs, and the SG can be referred to as a first SG.

Second, the processor 502 records a first correspondence, where the first correspondence is a correspondence between an IP address in a source IP address field of the first data packet and the first SGT.

After receiving a data packet in the trusted domain, the processor 502 records a correspondence between an IP address in a source IP address field in an IP header of the data packet and an SGT of the data packet. After the network device receives multiple data packets, the network device records multiple correspondences according to the multiple data packets. The multiple correspondences form a first correspondence set, and the first correspondence set includes multiple correspondences between IP addresses and SGTs. Furthermore, for the first data packet, the network device records the first correspondence, where the first correspondence is the correspondence between the first SGT and the IP address in the source IP address field of the first data packet.

After receiving the data packet, the network device generally needs to forward the data packet. A function of forwarding a data packet is implemented by a forwarding plane of the network device. Generally, the forwarding plane of the network device may be implemented by a hardware chip, or may be implemented by a CPU, that is, implemented by software. To easily implement this embodiment of the present disclosure, in a case in which the forwarding plane is implemented by a hardware chip, the processor 502 is the hardware chip, or a combination of a CPU and the hardware chip, and the hardware chip records the first correspondence set that includes the first correspondence. In a case in which the forwarding plane is implemented by a CPU, the processor 502 is the CPU or a combination of the CPU and a hardware chip, and the CPU records the first correspondence set that includes the first correspondence. Optionally, in the case in which the forwarding plane is implemented by the hardware chip, the processor 502 may be the CPU, or the combination of the CPU and the hardware chip, and the CPU records the first correspondence set that includes the first correspondence. The processor 502 records the first correspondence set that includes the first correspondence in the memory. If the memory includes a CAM, the processor 502 may record the first correspondence set in the CAM in order to implement quick search for a correspondence in the first correspondence set. Optionally, if the memory includes a RAM, the processor 502 may record the first correspondence set in the RAM.

Third, the processor 502 receives a second data packet using the interface 504, where an IP address in a destination IP address field of the second data packet is the IP address in the source IP address field of the first data packet.

The processor 502 receives the data packet in the trusted domain using the interface 504, or in a case in which the network device is a network device at an edge of the trusted domain, the processor 502 receives, using the interface 504, a data packet that just enters the trusted domain. Furthermore, a sender of the first data packet should receive the second data packet. The IP address in the destination IP address field of the second data packet is an IP address of a receiver of the second data packet, namely, an IP address of the sender of the first data packet. Therefore, the destination IP address of the second data packet is the same as the source IP address of the first data packet.

Next, the processor 502 acquires the first SGT according to the IP address in the destination IP address field of the second data packet and the first correspondence.

After receiving the data packet, the processor 502 determines whether an IP address in a destination IP address field of the data packet is included in a correspondence in the first correspondence set recorded in the memory by the processor 502, and further determines, according to the correspondence, an SGT corresponding to the destination IP address of the data packet. A network security policy not only may be related to a SG of a sender of the data packet, but also may be related to a SG of a receiver of the data packet. Determining, according to the first correspondence set recorded by the network device, the SGT related to the destination IP address of the data packet can help implement network security policy execution based on the receiver of the data packet. Determining the SGT of the receiver of the data packet according to the first correspondence set recorded by the network device can avoid using a dedicated protocol to propagate the SGT. Furthermore, for the second data packet, the processor 502 finds the first correspondence according to the destination IP address of the second data packet after the processor 502 receives the second data packet. The first SGT in the first correspondence is an SGT corresponding to the receiver of the second data packet, namely, the sender of the first data packet.

Finally, the processor 502 acquires a network security policy according to the acquired first SGT and a preset second correspondence, and executes the network security policy on the second data packet, where the second correspondence is a correspondence between the first SGT and the network security policy.

There is a preset second correspondence set in the memory. If the memory includes a CAM, the second correspondence set may be stored in the CAM in order to implement quick search for a correspondence in the second correspondence set. The second correspondence set includes multiple correspondences, where at least one correspondence includes a network security policy that is executed based on the SGT of the receiver of the data packet. The processor 502 obtains, according to the SGT corresponding to the receiver of the second data packet, namely, the first SGT, one correspondence from the second correspondence set. This correspondence is referred to as the second correspondence. The second correspondence includes the network security policy that is executed based on the SGT of the receiver of the data packet, namely, the first SGT. The processor 502 acquires the network security policy corresponding to the first SGT. Then, the processor 502 may execute the network security policy on the second data packet according to the network security policy corresponding to the first SGT. To ease implementation of this embodiment of the present disclosure, in a case in which the forwarding plane is implemented by a hardware chip, the processor 502 is the hardware chip, or a combination of a CPU and the hardware chip, and the hardware chip acquires and executes the network security policy. In a case in which the forwarding plane is implemented by a CPU, the processor 502 is the CPU or a combination of the CPU and a hardware chip, and the CPU acquires and executes the network security policy. Optionally, in a case in which the forwarding plane is implemented by the hardware chip, the processor 502 may be the CPU, or the combination of the CPU and the hardware chip, and the CPU acquires and executes the network security policy.

The network security policy may be related to the SG of the sender of the data packet, may be related to the SG of the receiver of the data packet, or may be related to a combination of the SG of the sender of the data packet and the SG of the receiver of the data packet. In the last case, at least one correspondence in the second correspondence set includes a network security policy that is executed based on a combination of the SGT of the receiver of the data packet and the SGT of the sender of the data packet. That is, in the at least one correspondence, the network security policy is corresponding to the combination of the two SGTs.

If it is the data packet in the trusted domain that the network device receives, that is, the second data packet includes an SGT of the second data packet, namely, a second SGT, then the network device acquires, according to the acquired first SGT, the second SGT, and a correspondence that includes the first SGT and the second SGT, namely, the second correspondence, in the second correspondence set, a network security policy corresponding to a combination of the first SGT and the second SGT in the second correspondence. Then, the network device executes the network security policy on the second data packet. The second SGT is used to identify the SG to which the second data packet belongs.

If the second data packet received by the processor 502 does not include the SGT of the second data packet, the processor 502 allocates the second SGT to the second data packet. The second SGT is used to identify the SG to which the second data packet belongs. Generally, in a case in which the network device is the network device at the edge of the trusted domain, the second data packet just enters the trusted domain and no SGT is allocated to the second data packet by another network device in the trusted domain, and the network device serves as the ingress to the trusted domain, and the processor 502 of the network device allocates the second SGT to the second data packet according to device and user credentials acquired during authentication. The processor 502 adds, to the second data packet, the second SGT allocated to the second data packet. The processor 502 acquires, according to the acquired first SGT, the second SGT allocated to the second data packet, and the correspondence that includes the first SGT and the second SGT, namely, the second correspondence, in the second correspondence set, the network security policy corresponding to the combination of the first SGT and the second SGT in the second correspondence, and executes the network security policy on the second data packet.

A network that does not support the trusted network security architecture, namely, a network that does not support an SGT, may exist between two or more trusted domains. In the foregoing case in which the network device is at an edge of one of the domains, if the network device is an egress for a data packet, the network device may propagate a correspondence, recorded by the network device, between an IP address and an SGT to another trusted domain, where the network that does not support the trusted network security architecture exists between the trusted domain in which the network device is located and the other trusted domain. For example, the processor 502 of the network device sends, using the interface 504, a synchronization message to one or more other network devices via a network that does not support the first SGT, where a payload of the synchronization message includes the first correspondence. Generally, if the synchronization message is a data link layer frame, that is, the synchronization message does not include a network layer header, the payload of the synchronization message is a data link layer payload, if the synchronization message is a network layer packet, the payload of the synchronization message is a network layer payload. If the processor 502 includes a CPU, generally, the CPU generates the synchronization message and sends, using the interface 504, the synchronization message.

Before performing the steps in this embodiment of the present disclosure, multiple network devices in the trusted domain may initiate a capability negotiation procedure, to determine whether each network device in the trusted domain supports a function, in this embodiment of the present disclosure, of acquiring the first correspondence set using the data packet. In a case in which a network device that does not support the function, in this embodiment of the present disclosure, of acquiring the first correspondence set using the data packet exists in the trusted domain, the processor 502 of the network device that supports this embodiment of the present disclosure sends, using the interface 504, a synchronization message to the network device that does not support this embodiment of the present disclosure in order to propagate a correspondence, recorded by the network device, between an IP address and an SGT.

In this scenario, a network device records a correspondence, between an IP address and an SGT, that is in a received data packet, and another network device does not need to propagate SGT information to the network device using a dedicated protocol, thereby decreasing network resource consumption and reducing network complexity. In addition, the network device executes, according to the correspondence between the IP address and the SGT recorded by the network device, a network security policy with respect to a receiver of a data packet, and SGT information of the receiver does not need to be specially propagated to the network device, thereby decreasing network resource consumption and reducing network complexity.

In a second scenario of this embodiment, the processor 502 performs the following steps.

First, the processor 502 receives a synchronization message using the interface, where a payload of the synchronization message includes a first correspondence, and the first correspondence is a correspondence between an IP address and a first SGT.

The network device is a network device in a trusted network security architecture. The network device is located in a trusted domain. In the following, a data packet that is sent and received between any two network devices in the trusted domain is referred to as a data packet in the trusted domain. Each data packet in the trusted domain includes an SGT. The SGT of the data packet in the trusted domain may be in a data link layer header or a network layer header of the data packet. For example, the SGT may be located in a header of an Ethernet frame of the data packet, namely, an Ethernet header, or the SGT may be located in a header of an IP packet of the data packet, namely, an IP header. The SGT of the data packet in the trusted domain is used to identify a SG to which the data packet belongs.

A network that does not support the trusted network security architecture, namely, a network that does not support an SGT, may exist between two or more trusted domains. A network device at an edge of one of the trusted domains is an egress for a data packet. The network device at the edge of the trusted domain sends the synchronization message to a network device in another trusted domain via the network that does not support an SGT, where the payload of the synchronization message includes the first correspondence.

After receiving the synchronization message using the interface 504, the processor 502 records the correspondence between the IP address and the SGT in the synchronization message. After the network device receives multiple synchronization messages, the network device records multiple correspondences according to the multiple synchronization messages. The multiple correspondences form a first correspondence set, and the first correspondence set includes multiple correspondences between IP addresses and SGTs. To easily implement the embodiment of the present disclosure, in a case in which a forwarding plane is implemented by a hardware chip, the processor 502 is the hardware chip, or a combination of a CPU and the hardware chip, and the hardware chip records the first correspondence set that includes the first correspondence. In a case in which the forwarding plane is implemented by a CPU, the processor 502 is the CPU or a combination of the CPU and a hardware chip, and the CPU records the first correspondence set that includes the first correspondence. Optionally, in the case in which the forwarding plane is implemented by the hardware chip, the processor 502 may be the CPU, or the combination of the CPU and the hardware chip, and the CPU records the first correspondence set that includes the first correspondence. The processor 502 records the first correspondence set that includes the first correspondence in the memory. If the memory includes a CAM, the processor 502 may record the first correspondence set in the CAM in order to implement quick search for a correspondence in the first correspondence set. Optionally, if the memory includes a RAM, the processor 502 may record the first correspondence set in the RAM.

Second, the processor 502 receives a data packet using the interface, where an IP address in a destination IP address field of the data packet is the IP address in the first correspondence.

The processor 502 receives a data packet in the trusted domain using the interface 504, or in a case in which the network device is a network device at an edge of the trusted domain, the processor 502 receives, using the interface 504, a data packet that just enters the trusted domain. In a case in which the network device has received a synchronization message related to a receiver of the data packet, an IP address of the receiver of the data packet is an IP address in a correspondence in this synchronization message. That is, an IP address in one correspondence in the first correspondence set recorded by the network device, namely, in the foregoing first correspondence, is the same as the IP address in the destination IP address field of the data packet.

If the data packet received by the processor 502 does not include an SGT, and an IP address in a source IP address field of the data packet is the IP address in the first correspondence, the processor 502 adds the first SGT in the first correspondence to the data packet according to the source IP address of the data packet and the first correspondence.

Third, the processor 502 acquires the first SGT according to the IP address in the destination IP address field of the data packet and the first correspondence.

After receiving the data packet, the processor 502 determines whether an IP address in a destination IP address field of the data packet is included in a correspondence in the first correspondence set recorded in the memory by the processor 502, and further determines, according to the correspondence, an SGT corresponding to the destination IP address of the data packet. A network security policy not only may be related to a SG of a sender of the data packet, but also may be related to a SG of a receiver of the data packet. Determining, according to the first correspondence set recorded by the network device, an SGT related to a destination IP address of the data packet can help implement network security policy execution based on the receiver of the data packet. Furthermore, for the data packet in which the IP address in the destination IP address field is the IP address in the first correspondence, the processor 502 finds the first correspondence according to the destination IP address of the data packet after the processor 502 receives the data packet. The first SGT in the first correspondence is an SGT corresponding to a receiver of a second data packet.

Finally, the processor 502 acquires a network security policy according to the acquired first SGT and a preset second correspondence, and executes the network security policy on the second data packet, where the second correspondence is a correspondence between the first SGT and the network security policy.

There is a preset second correspondence set in the memory. If the memory includes a CAM, the second correspondence set may be stored in the CAM in order to implement quick search for a correspondence in the second correspondence set. The second correspondence set includes multiple correspondences, where at least one correspondence includes a network security policy that is executed based on the SGT of the receiver of the data packet. The processor 502 obtains, according to the SGT corresponding to the receiver of the data packet, namely, the first SGT, one correspondence from the second correspondence set. This correspondence is referred to as the second correspondence. The second correspondence includes the network security policy that is executed based on the SGT of the receiver of the data packet, namely, the first SGT. The processor 502 acquires the network security policy corresponding to the first SGT. Then, the processor 502 may execute the network security policy on the data packet according to the network security policy corresponding to the first SGT. To ease implementation of this embodiment of the present disclosure, in a case in which the forwarding plane is implemented by a hardware chip, the processor 502 is the hardware chip, or a combination of a CPU and the hardware chip, and the hardware chip acquires and executes the network security policy. In a case in which the forwarding plane is implemented by a CPU, the processor 502 is the CPU or a combination of the CPU and a hardware chip, and the CPU acquires and executes the network security policy. Optionally, in the case in which the forwarding plane is implemented by the hardware chip, the processor 502 may be the CPU, or the combination of the CPU and the hardware chip, and the CPU acquires and executes the network security policy.

The network security policy may be related to the SG of the sender of the data packet, may be related to the SG of the receiver of the data packet, or may be related to a combination of the SG of the sender of the data packet and the SG of the receiver of the data packet. In the last case, at least one correspondence in the second correspondence set includes a network security policy that is executed based on a combination of the SGT of the receiver of the data packet and an SGT of the sender of the data packet. That is, in the at least one correspondence, the network security policy is corresponding to the combination of the two SGTs.

If it is the data packet in the trusted domain that the network device receives, that is, the data packet includes an SGT of the data packet, namely, a second SGT, then the network device acquires, according to the acquired first SGT, the second SGT, and a correspondence that includes the first SGT and the second SGT, namely, the second correspondence, in the second correspondence set, a network security policy corresponding to a combination of the first SGT and the second SGT in the second correspondence. Then, the network device executes the network security policy on the data packet. The second SGT is used to identify a SG to which the data packet belongs.

If the data packet received by the processor 502 does not include the SGT of the data packet, the network device allocates the second SGT to the data packet. The second SGT is used to identify the SG to which the data packet belongs. Generally, in the case in which the network device is the network device at the edge of the trusted domain, the data packet just enters the trusted domain and no SGT is allocated to the data packet by another network device in the trusted domain, and the network device serves as the ingress to the trusted domain, and the processor 502 of the network device allocates the second SGT to the data packet according to device and user credentials acquired during authentication. The processor 502 adds, to the data packet, the second SGT allocated to the data packet. The processor 502 acquires, according to the acquired first SGT, the second SGT allocated to the data packet, and the correspondence that includes the first SGT and the second SGT, namely, the second correspondence, in the second correspondence set, the network security policy corresponding to the combination of the first SGT and the second SGT in the second correspondence, and executes the network security policy on the data packet.

In this embodiment, a network device records a correspondence between an IP address and an SGT and executes, according to the correspondence between the IP address and the SGT recorded by the network device, a network security policy with respect to a receiver of a data packet, and SGT information of the receiver does not need to be specially propagated to the network device, thereby decreasing network resource consumption and reducing network complexity.

A person of ordinary skill in the art may understand that all or some of the steps of the method embodiments may be implemented by a program instructing a processor. The program may be stored in a computer-readable storage medium. The storage medium may be a RAM, a ROM, a flash memory, a HDD, a SSD, a magnetic tape, a floppy disk, an optical disc, and any combination thereof.

The foregoing descriptions are merely exemplary implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A network security method, comprising:
   receiving, by a network device, a first data packet that comprises a first security group tag, the first security group tag identifying a security group to which the first data packet belongs, and the network device being located in a trusted domain;
   recording, by the network device, a first correspondence into a correspondence set, the first correspondence being a correspondence between the first security group tag and an Internet Protocol (IP) address in a source IP address field of the first data packet;
   receiving, by the network device, a second data packet;
   indexing, by the network device, the correspondence set by an IP address in a destination IP address field of the second data packet to acquire the first security group tag in the recorded first correspondence, the IP address in the destination IP address field of the second data packet being the IP address in the source IP address field of the first data packet;
   acquiring, by the network device, a network security policy according to the acquired first security group tag and a preset second correspondence, the second correspondence being a correspondence between the first security group tag and the network security policy; and
   executing, by the network device, the network security policy on the second data packet.

2. The method of claim 1, wherein the second data packet comprises a second security group tag, the second security group tag identifying the security group to which the second data packet belongs, and the network device acquiring the network security policy according to the acquired first security group tag and the preset second correspondence, and the network device executing the network security policy on the second data packet further comprising:
  acquiring, by the network device, the network security policy according to the preset second correspondence and a combination of the first security group tag and the acquired second security group tag, the second correspondence comprising correspondences between the first security group tag, the second security group tag, and the network security policy; and
  executing, by the network device, the network security policy on the second data packet.

3. The method of claim 1, wherein after receiving, by the network device, the second data packet, the method further comprises allocating, by the network device, a second security group tag to the second data packet, the second security group tag identifying the security group to which the second data packet belongs, and the network device acquiring the network security policy according to the acquired first security group tag and the preset second correspondence, and the network device executing the network security policy on the second data packet further comprising:
  acquiring, by the network device, the network security policy according to the preset second correspondence and a combination of the first security group tag and the acquired second security group tag, the second correspondence comprising correspondences between the first security group tag, the second security group tag, and the network security policy; and
  executing, by the network device, the network security policy on the second data packet.

4. The method of claim 1, further comprising sending, by the network device, a synchronization message to one or more other network devices via a network that does not support the first security group tag, a payload of the synchronization message comprising the first correspondence, the one or more other network devices being located in a trusted domain different from the trusted domain in which the network device is located, and the network that does not support the first security group tag existing between the trusted domain in which the one or more other network devices are located and the trusted domain in which the network device is located.

5. A network security method, comprising:
  receiving, by a network device, a synchronization message from another network device, a payload of the synchronization message comprising an Internet Protocol (IP) address and a first security group tag that identify a first correspondence, the IP address being different from each of a source address and a destination address of the synchronization message, the first correspondence being a correspondence between the IP address and the first security group tag, the network device being located in a trusted domain, the other network device being located in another trusted domain, and a network that does not support the first security group tag existing between the trusted domain and the other trusted domain;
  receiving, by the network device, a data packet, an IP address in a destination IP address field of the data packet being the IP address in the first correspondence;
  acquiring, by the network device, the first security group tag according to the IP address in the destination IP address field of the data packet and the first correspondence;
  acquiring, by the network device, a network security policy according to the acquired first security group tag and a preset second correspondence, the second correspondence being a correspondence between the first security group tag and the network security policy; and
  executing, by the network device, the network security policy on the data packet.

6. The method of claim 5, wherein the data packet comprises a second security group tag, the second security group tag identifying the security group to which the data packet belongs, and the network device acquiring the network security policy according to the acquired first security group tag and the preset second correspondence, and the network device executing the network security policy on the data packet further comprising:
  acquiring, by the network device, the network security policy according to the preset second correspondence and a combination of the first security group tag and the acquired second security group tag, the second correspondence comprising correspondences between the first security group tag, the second security group tag, and the network security policy; and
  executing, by the network device, the network security policy on the data packet.

7. The method of claim 5, wherein after receiving, by the network device, the data packet, the method further comprises allocating, by the network device, a second security group tag to the data packet, the second security group tag identifying the security group to which the data packet belongs, and the network device acquiring the network security policy according to the acquired first security group tag and the preset second correspondence, and the network device executing the network security policy on the data packet further comprising:
  acquiring, by the network device, the network security policy according to the preset second correspondence and a combination of the first security group tag and the acquired security group tag, the second correspondence comprising correspondences between the first security group tag, the second security group tag, and the network security policy; and
  executing the network security policy on the data packet.

8. A network device located in a trusted domain, comprising:
  a physical network interface; and
  a hardware processor coupled to the physical network interface using a bus, the hardware processor being configured to:
    receive, using the physical network interface, a first data packet that comprises a first security group tag, the first security group tag identifying a security group to which the first data packet belongs;
    record a first correspondence into a correspondence set, the first correspondence being a correspondence between the first security group tag and an Internet Protocol (IP) address in a source IP address field of the first data packet;
    receive, using the physical network interface, a second data packet;
    index the correspondence set by an IP address in a destination IP address field of the second data packet to acquire the first security group tag in the recorded first correspondence, the IP address in the destination IP address field of the second data packet is the IP address in the source IP address field of the first data packet;
acquire a network security policy according to the acquired first security group tag and a preset second correspondence, the second correspondence being a correspondence between the first security group tag and the network security policy; and
execute the network security policy on the second data packet.

9. The network device of claim 8, wherein the second data packet comprises a second security group tag, the second security group tag identifying the security group to which the second data packet belongs, and the hardware processor being further configured to:
acquire the network security policy according to the preset second correspondence and a combination of the first security group tag and the acquired second security group tag, the second correspondence comprising correspondences between the first security group tag, the second security group tag, and the network security policy; and
execute the network security policy on the second data packet.

10. The network device of claim 8, wherein the hardware processor is further configured to:
allocate a second security group tag to the second data packet after receiving the second data packet using the physical network interface, the second security group tag identifying the security group to which the second data packet belongs;
acquire the network security policy according to the preset second, correspondence and a combination of the first security group tag and the acquired security group tag, the second correspondence comprising correspondences between the first security group tag, the second security group tag, and the network security policy; and
execute the network security policy on the second data packet.

11. The network device of claim 8, wherein the hardware processor is further configured to send, using the physical network interface, a synchronization message to one or more other network devices via a network that does not support the first security group tag, a payload of the synchronization message comprising the first correspondence, the one or more other network devices being located in a trusted domain different from the trusted domain in which the network device is located, and the network that does not support the first security group tag existing between the trusted domain in which the one or more other network devices are located and the trusted domain in which the network device is located.

12. A network device located in a trusted domain, comprising:
a physical network interface; and
a hardware processor coupled to the physical network interface using a bus, the hardware processor being configured to:
receive, using the physical network interface, a synchronization message from another network device, a payload of the synchronization message comprising an Internet Protocol (IP) address and a first security group tag that identify a first correspondence, the IP address being different from each of a source address and a destination address of the synchronization message, the first correspondence being a correspondence between the IP address and the first security group tag, the other network device being located in another trusted domain, and a network that does not support the first security group tag existing between the trusted domain in which the network device is located and the other trusted domain;
receive a data packet using the physical network interface, an IP address in a destination IP address field of the data packet being the IP address in the first correspondence;
acquire the first security group tag according to the IP address in the destination IP address field of the data packet and the first correspondence;
acquire a network security policy according to the acquired first security group tag and a preset second correspondence, the second correspondence being a correspondence between the first security group tag and the network security policy; and
execute the network security policy on the data packet.

13. The network device of claim 12, wherein the data packet comprises a second security group tag, the second security group tag identifying the security group to which the data packet belongs, and the hardware processor being further configured to execute, the network security policy according to the preset second correspondence and a combination of the first security group tag and the acquired second security group tag, and the second correspondence comprising correspondences between the first security group tag, the second security group tag, and the network security policy.

14. The network device of claim 12, wherein the hardware processor is further configured to:
allocate a second security group tag to the data packet after receiving the data packet using the physical network interface; and
execute the network security policy according to the preset second correspondence and a combination of the first security group tag and the acquired second security group tag, the second correspondence comprising correspondences between the first security group tag, the second security group tag, and the network security policy.

* * * * *